United States Patent
Bai et al.

(10) Patent No.: US 10,465,079 B2
(45) Date of Patent: Nov. 5, 2019

(54) AQUEOUS SURFACE COATING COMPOSITION AND MODIFIED PARTICLES COMPRISING HYDROPHOBIC AND HYDROPHILIC MOIETIES

(71) Applicant: 3M INNOVATIVE PROPERTIES COMPANY, St. Paul, MN (US)

(72) Inventors: Feng Bai, Woodbury, MN (US); Wendy L. Thompson, Roseville, MN (US); Haeen Sykora, New Richmond, WI (US); Terry R. Hobbs, Stillwater, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 68 days.

(21) Appl. No.: 15/113,179

(22) PCT Filed: Jan. 22, 2015

(86) PCT No.: PCT/US2015/012351
§ 371 (c)(1),
(2) Date: Jul. 21, 2016

(87) PCT Pub. No.: WO2015/116459
PCT Pub. Date: Aug. 6, 2015

(65) Prior Publication Data
US 2017/0009085 A1    Jan. 12, 2017

Related U.S. Application Data

(60) Provisional application No. 61/933,143, filed on Jan. 29, 2014, provisional application No. 62/055,758, filed on Sep. 26, 2014.

(51) Int. Cl.
*B32B 5/16* (2006.01)
*C09D 5/16* (2006.01)
(Continued)

(52) U.S. Cl.
CPC ........... *C09D 5/1687* (2013.01); *B05D 3/007* (2013.01); *C08K 9/06* (2013.01); *C09D 5/022* (2013.01);
(Continued)

(58) Field of Classification Search
CPC ................ B01F 17/007; B01F 17/0071; B01F 17/0028; C01B 33/159; C09C 1/3081; C01P 2004/62; C01P 2004/64
(Continued)

(56) References Cited

U.S. PATENT DOCUMENTS 3,689,300 A    9/1972    Bunger
4,715,986 A    12/1987   Gruning
(Continued)

FOREIGN PATENT DOCUMENTS

DE    10131173    1/2003
JP    06-080933   3/1994
(Continued)

OTHER PUBLICATIONS

3M Material Safety Data Sheet—3M Spangle Floor Finish, Sep. 27, 2011 (Year: 2011).*
(Continued)

*Primary Examiner* — Hoa (Holly) Le
(74) *Attorney, Agent, or Firm* — Daniel J. Iden (57) ABSTRACT

Embodiments can include aqueous coating compositions, modified particles and methods. In an embodiment, an aqueous coating composition is included with particles having an inorganic core, a surface on the outside of the core, an agent including a hydrophobic moiety adhering to the surface, and an agent including a hydrophilic moiety adhering to the surface. The aqueous coating composition can further include a film forming polymer composition including a polymer and water. The particles can be mixed (Continued)

with the polymer composition. In an embodiment, a method of coating a flooring surface is included, the method including applying an aqueous coating composition to a flooring surface and drying the aqueous coating composition. In an embodiment, a particle is included. The particle can include agents including a hydrophobic moiety adhering to the surface of the particle and agents including a hydrophilic moiety adhering to the surface. Other embodiments are also included herein.

26 Claims, 1 Drawing Sheet (51) Int. Cl.
　　C09D 5/02　　(2006.01)
　　C09D 183/06　　(2006.01)
　　C08K 9/06　　(2006.01)
　　B05D 3/00　　(2006.01)
　　C09D 175/04　　(2006.01)
(52) U.S. Cl.
　　CPC ......... *C09D 175/04* (2013.01); *C09D 183/06* (2013.01); *C08K 2201/003* (2013.01)
(58) Field of Classification Search
　　USPC .................................................. 428/403–407
　　See application file for complete search history.

(56) References Cited

U.S. PATENT DOCUMENTS

| | | |
|---|---|---|
| 6,197,844 B1 | 3/2001 | Hamrock |
| 6,416,838 B1 | 7/2002 | Arney |
| 6,518,334 B1 | 2/2003 | Calhoun |
| 6,586,483 B2 | 7/2003 | Kolb |
| 6,727,309 B1 | 4/2004 | Paiva |
| 6,800,353 B1 | 10/2004 | Anderson |
| 7,189,768 B2 | 3/2007 | Baran, Jr. |
| 7,282,272 B2 | 10/2007 | Jones |
| 7,326,448 B2 | 2/2008 | Jones |
| 7,427,438 B2 | 9/2008 | Jones |
| 7,544,726 B2 | 6/2009 | Greenwood |
| 7,547,476 B2 | 6/2009 | Jones |
| 7,553,888 B2 | 6/2009 | Greenwood |
| 7,572,848 B2 | 8/2009 | Savu |
| 7,642,309 B2 | 1/2010 | Tarng |
| 7,727,323 B2 | 6/2010 | Tarng |
| 7,745,010 B2 | 6/2010 | Schneider |
| 7,811,670 B2 | 10/2010 | Ragunathan |
| 7,947,763 B2 | 5/2011 | Tarng |
| 8,231,970 B2 | 7/2012 | Walters |
| 8,236,885 B2 | 8/2012 | Tarng |
| 8,283,042 B2 | 10/2012 | Millero |
| 8,288,000 B2 | 10/2012 | Ragunathan |
| 2002/0147258 A1 | 10/2002 | Yarmey |
| 2003/0113489 A1 | 6/2003 | Smith |
| 2006/0078736 A1 | 4/2006 | Fukazawa et al. |
| 2006/0210636 A1 | 9/2006 | Nonninger |
| 2012/0190755 A1 | 7/2012 | Muehlbach et al. |
| 2013/0164450 A1 | 6/2013 | Hobbs |
| 2014/0000152 A1 | 1/2014 | Torncrona et al. |
| 2014/0034651 A1 | 2/2014 | Durand et al. |

FOREIGN PATENT DOCUMENTS

| | | |
|---|---|---|
| JP | 08-041382 | 2/1996 |
| JP | 11-001630 | 1/1999 |
| JP | 2003-128976 A | 5/2003 |
| JP | 2006-117445 A | 5/2006 |
| JP | 2008-105919 A | 5/2008 |
| WO | WO 1998-011168 | 3/1998 |
| WO | WO 1998-027162 | 6/1998 |
| WO | WO 2002-020678 | 3/2002 |
| WO | WO 2002-070612 | 9/2002 |
| WO | WO 2003-102089 | 12/2003 |
| WO | WO 2007-001418 | 1/2007 |
| WO | WO 2009-054955 | 4/2009 |
| WO | WO 2012-123386 | 9/2012 |

OTHER PUBLICATIONS

EP Extended Search Report, EP 15742666, dated Jul. 17, 2017 (8 pages).
Arkles, "Hydrophobicity, Hydrophilicity and Silane Surface Modification", Gelest, Inc., 2011, Version 2.0, pp. 1-80.
Beckford, "Wear-Resistant PTFE/SiO2 Nanoparticle Composite Films", Tribology Transactions, 2011, vol. 54, pp. 849-858.
Kang, "Friction and wear behavior of nanosilica-filled epoxy resin composite coatings", Applied Surface Science, 2012, vol. 258, pp. 6384-6390.
Miller, "Densification for High Performance Floors", Chusid Associates, Concrete Tech. Today—Densifying Concrete, 2009, pp. 1-10.
Zhang, "Transparent Wear-Resistant Acrylate-Based Coating With Highly Filled Nanosilica Particles", Nano Structured Surface and Coating, 2009, pp. 1-10.
Zou, "Adhesion and friction studies of a nano-textured surface produced by spin coating of colloidal silica nanoparticle solution", Tribology Letters, 2006, vol. 21, No. 1, pp. 25-30.
International Search Report for PCT International Application PCT/US2015/012351, dated Apr. 24, 2015, 4 pages.

\* cited by examiner

AQUEOUS SURFACE COATING COMPOSITION AND MODIFIED PARTICLES COMPRISING HYDROPHOBIC AND HYDROPHILIC MOIETIES

CROSS REFERENCE TO RELATED APPLICATIONS

This application is a national stage filing under 35 U.S.C. 371 of PCT/US2015/012351, filed Jan. 22, 2015, which claims the benefit of U.S. Provisional Application No. 61/933,143, filed Jan. 29, 2014 and U.S. Provisional Application No. 62/055,758, filed Sep. 26, 2014, the disclosures of which are incorporated by reference in their entirety herein.

BACKGROUND

Surface coating compositions, such as floor finishes or polishes, have many applications for both improving surface aesthetics and aiding in surface maintenance and protection. Such coating compositions are frequently applied to a floor surface (or other type of surface) and then allowed to dry in air, normally at ambient temperature and humidity. A film is formed that serves as a protective barrier against soil deposited on the floor by pedestrian or other traffic, for example. These same coating compositions can be applied to other substrate surfaces for which protection is desired, such as tile floors, walls, furniture, windows, counter tops, bathroom surfaces, fiberglass surfaces, plastic surfaces, and the like.

SUMMARY

Embodiments herein can include aqueous coating compositions, modified particles, and related methods. In an embodiment, an aqueous coating composition is included with particles having an inorganic core, a surface on the outside of the core, an agent including a hydrophobic moiety adhering to the surface, and an agent including a hydrophilic moiety adhering to the surface. The aqueous coating composition can further include a film forming polymer composition including a polymer and water. The particles can be mixed with the polymer composition.

In an embodiment, a method of coating a substrate surface is included, the method including applying an aqueous coating composition to a flooring surface. The aqueous coating composition can include particles having an inorganic core, a surface on the outside of the core, an agent including a hydrophobic moiety adhering to the surface, and an agent including a hydrophilic moiety adhering to the surface. The aqueous coating composition can further include a film forming polymer composition including a polymer and water. The method can further include drying the aqueous coating composition.

In an embodiment, a particle is included. The particle includes an inorganic core and a surface on the outside of the core. The particle further includes a plurality of agents including a hydrophobic moiety adhering to the surface and a plurality of agent including a hydrophilic moiety adhering to the surface. The particle can have a diameter of between about 5 nm and about 200 nm. In some embodiments, at least about 20% of the particle surface is covered by the agents including a hydrophilic moiety and the agents including a hydrophobic moiety. The ratio of agents including a hydrophilic moiety to agents having a hydrophobic moiety can be from about 80:1 to about 2:1 (mole:mole).

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present disclosure is defined by the appended claims and their legal equivalents.

BRIEF DESCRIPTION OF THE DRAWINGS

Embodiments may be more completely understood in connection with the following drawings, in which.

While embodiments herein susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

The embodiments described herein are not intended to be exhaustive or to limit to the precise forms disclosed in the following detailed description. Rather, the embodiments are chosen and described so that others skilled in the art can appreciate and understand the principles and practices of the present embodiments.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Embodiments herein relate to an aqueous surface coating composition including a film-forming polymer composition and inorganic particles dispersed within the polymer composition. The inorganic particles include an agent including a hydrophobic moiety adhering to the surface of the particles and an agent including a hydrophilic moiety adhering to the surface of the particles.

The resultant coatings made with the surface coating composition have desirable coefficients of friction and significant water resistance. By way of example, the resultant coatings, when dried, can exhibit a water resistance that is greater than a coating that is formed by an otherwise identical composition including only particles with an agent comprising a hydrophilic moiety adhering to the surface and lacking an agent comprising a hydrophobic moiety adhering to the surface. In various embodiments, the resultant coatings, when dried, can exhibit a water resistance sufficient for the coating to exhibit no damage after exposure to water for 24 hours. In various embodiments, the resultant coatings, when dried, can exhibit a coefficient of friction (measured consistent with ASTM D2047, for example) when dried on the surface of a substrate that is greater than about 0.6. In some embodiments, the coefficient of friction can be greater than about 0.65. In some embodiments, the coefficient of friction can be greater than about 0.7. In some embodiments, the coefficient of friction can be greater than about 0.75.

In various embodiments, the coating that results through application of coating compositions herein to a surface or substrate can exhibit desirable optical properties. Gloss of a surface can be tested in various ways, including but not limited to ASTM D523. By way of example, in some embodiments, the resulting coating can exhibit a gloss (60°) of greater than about 60, or greater than about 65, or greater than about 70, or greater than about 75, or greater than about 80.

Distinctness of Image (DOI) can be measured in various ways, including but not limited to ASTM D5767. In some embodiments, the resulting coating can exhibit a Distinctness of Image (60°) of greater than 80, or greater than about 82, or greater than about 84, or greater than about 86, or greater than about 88, or greater than about 90, or greater than about 92.

Figure 1:
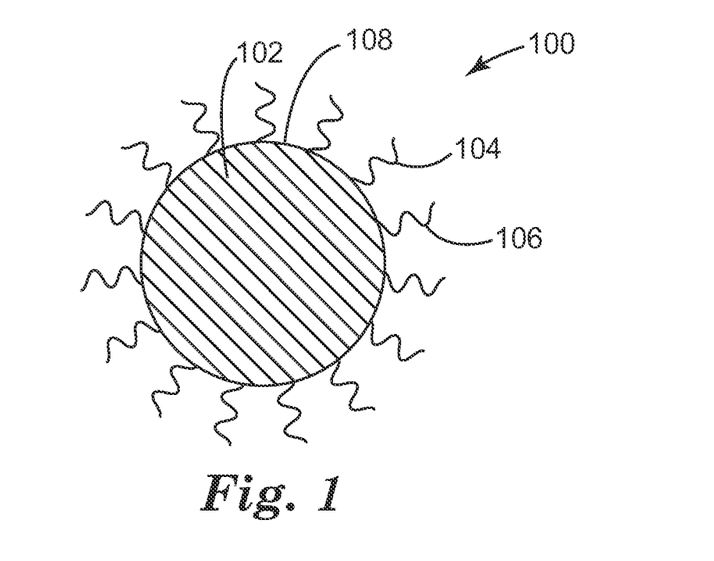
FIG. 1 is a schematic cross sectional view of a particle in accordance with various embodiments herein.
Figure 2:
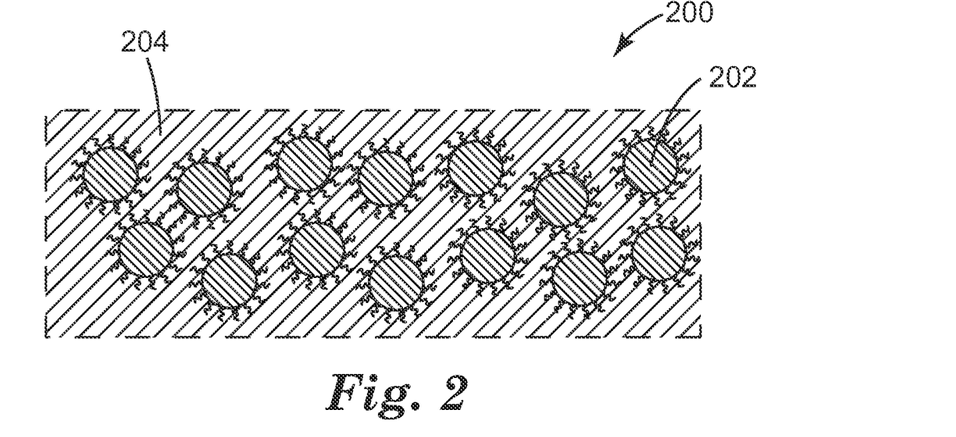
FIG. 2 is a schematic cross-sectional view of a portion of an aqueous coating composition in accordance with various embodiments herein.

Referring now to FIG. 1, a schematic cross sectional view of a particle 100 in accordance with various embodiments herein is shown. The particle can include a core 102 and a surface 108. Agents comprising hydrophilic moieties 104 and agents comprising hydrophobic moieties 106 can be adhered to the surface 108. Referring now to FIG. 2, a schematic cross-sectional view of a portion of an aqueous coating composition 200 is shown in accordance with various embodiments herein is shown. The aqueous coating composition can include particles 202 mixed with a polymer composition 204. Aspects of these components are described in greater details below.

The coating composition can be applied to a variety of substrates such as, for example, floor, wall, counter top, furniture, window, fiberglass surfaces, plastic surfaces and bathroom surfaces. In many cases, the substrate is a floor, but can be any surface upon which the coatable compositions described herein can be applied. Specific substrate materials can include, but are not limited to, vinyl, ceramic, cementitious, wood, fibrous surfaces, cultured stone, natural stone (including, but not limited to limestone, granite, quartzite, and marble amongst others), and the like.

In various embodiments, the inorganic particle material includes a plurality of particles modified by compounds having hydrophilic moieties and modified by compounds having hydrophobic moieties. The inorganic particles can include metal oxide particles in any oxidation state. Examples of metal oxides can include, but are not limited to, silica, alumina, zirconia, vanadia, titania, ceria, iron oxide, antimony oxide, tin oxide, alumina/silica and combinations thereof, with silica being a specific example. In some embodiments, the inorganic particles can be nanoparticles having an average particle size (diameter) of 5-200 nm. In some embodiments the particles can have an average size of from 5 to 40 nm. The particles can include an inorganic core and a surface on the outside of the core. In some embodiments, particles of a single specific size or size range can be used. In other embodiments, particles of a first specific size or size range can be used in conjunction with particles of a second (or subsequent) specific size or size range.

The particles can include an exterior surface that is modified. By way of example, surface modification of the inorganic particles can include the attachment of compounds thereto that modify the characteristics of the surface. The term "surface modified particle" can be used to refer to a particle that includes surface groups attached to the surface of the particle.

The agents used to modify the surface of the particles can include at least two functional ends, a first end (or ends) adhering to the outer surface of each inorganic particle and providing adhering functionality, and a second end (or ends) (or "tail") extending from the particle and providing functionality to change the characteristics of the particle. The term "adhering" includes, for example, covalent bonding, hydrogen bonding, electrostatic attraction, London forces, and hydrophobic interactions. The agents may be chemisorbed or physisorbed.

It will be appreciated that such agents can be applied as single compounds that includes both functionalities or can be formed in situ such as by applying a first compound that provides attachment (or coupling) functionality (including, but not limited to, aminosilanes, vinyl silanes, methacryl silanes) and bonding or otherwise attaching a second (or subsequent) compound thereto that provides the desired characteristic changing functionality.

The agents may comprise organic acids, organic bases, silanes and combinations thereof. The type of agent can depend on the type of inorganic particle and the chemistry of the surface coating composition. In embodiments (including, but not limited to, in the context of silica nanoparticles), the agents can specifically include silane coupling agents. Silane coupling agents are bifunctional organosilanes, and a number of acceptable silane coupling agents are available.

In various embodiments, one or more agents including a hydrophobic moiety are bound to the surface of the inorganic particle. Such agents can include, but are not limited to, silane coupling agents with tails that are hydrophobic. Agents with hydrophobic moieties can include those having alkane, alkene, or alkyne chains (linear, branched or cyclic), and phenyl functionality. In various embodiments, such agents can include chains lengths from C2 to C40. The hydrophobic agent can contain one or more hydrophobic groups or segments per molecule.

The hydrophobic agent can specifically include hydrophobic silanes, such as alkyl silanes or phenyl silanes. In some embodiments, the hydrophobic agent can be a compound of the formula $X^1$-$L^1$-$R^1$, wherein $X^1$ is an alkoxysilane or chlorosilane group, $L^1$ is a linking group, and $R^1$ is a hydrophobic moiety. Exemplary hydrophobic silanes can include those represented by the following structure: $X_m$Si—(Y—R)$_{4-m}$ where X is a hydrolysable moiety such as alkoxy, acyloxy or halogen; m is 1-3; Y is a bifunctional organic radical; and R is an organic radical that imparts a hydrophobic character.

Specific hydrophobic agents can include, but are not limited to trialkoxy or trichloro alkyl silanes with chain (linear, branched, or cyclic) lengths of $C_2$ to $C_{40}$, and in some embodiments chain lengths of $C_6$ to $C_{24}$. Hydrophobic agents can include, but are not limited to, ethyltrichlorosilane, ethyltrimethoxysilane, ethyltriethoxysilane, propyltrichlorosilane, propyltrimethoxysilane, propyltriethoxysilane, n-butyltrichlorosilane, n-butyltrimethoxysilane, n-butyltriethoxysilane, pentyltrichlorosilane, pentyltrimethoxysilane, pentyltriethoxysilane, hexyltrichlorosilane, hexyltrimethoxysilane, hexyltriethoxysilane, heptyltrichlorosilane, heptyltrimethoxysilane, heptyltriethoxysilane, octyltrichlorosilane, octyltrimethoxysilane, octyltriethoxysilane, isooctyltrichlorosilane, isooctyltrimethoxysilane, isooctyltriethoxysilane, decyltrichlorosilane, decyltrimethoxysilane, decyltriethoxysilane, undecyltrichlorosilane, undecyltrimethoxysilane, undecyltriethoxysilane, dodecyltrichlorosilane, dodecyltrimethoxysilane, dodecyltriethoxysilane, tetradecyltrichlorosilane, tetradecyltrimethoxysilane, tetradecyltriethoxysilane, hexadecyltrichlorosilane, hexadecyltrimethoxysilane, hexadecyltriethoxysilane, and the like.

In addition to the agent(s) including a hydrophobic moiety, in various embodiments, one or more agents including a hydrophilic moiety are bound to the surface of the inorganic particle. Such agents can include silane coupling agents with tails that are hydrophilic and can be nonionic or ionic. In some embodiments, the hydrophilic agent can be a compound of the formula $X^2$-$L^2$-$R^2$, wherein $X^2$ is an alkoxysilane or chlorosilane group, $L^2$ is a linking group, and $R^2$ is a hydrophilic moiety. Nonionic agents with hydrophilic moieties can include those having alcohol, amine, amide, urea, polyether, thiol, and/or carbonyl (such as ketones, aldehydes, esters), and the like, functionality. Acceptable nonionic hydrophilic silanes can include, for example, methoxyethoxyethoxyethoxyureidopropyltriethoxysilane $(CH_3CH_2O)_3$ $Si(CH_2)_3$ $NHC(O)OCH_2$ $CH_2OCH_2CH_2OCH_2CH_2OCH_3$, 1-[3-(trimethoxysilyl)propyl]urea, 3-triethoxysilyl propyl succinic anhydride, and various polyethylene glycol based silanes. Exemplary hydrophilic silanes can include those with polyethylene glycol tails, represented by the following structure: $X_mSi$—$(Y$—$OCH_2CH_2(OCH_2CH_2)_nOR)_{4-m}$ where X is a hydrolysable moiety such as alkoxy, acyloxy or halogen; m is 1-3; Y is a bifunctional organic radical; n is 1-100; and R is an organic radical that does not impart hydrophobic character.

In some embodiments, ionic hydrophilic agents are employed with either anionic or cationic functional groups. Anionic functional group types can include the salts of carboxylic acids, sulfonic acids, and phosphoric acids. Cationic types may include quaternary amines and protonated amines. The hydrophilic agent can contain one or more ionic groups per molecule. Hydrophilic silanes containing carboxylic acid salts can be used for silica particle surface modification. These can include carboxyethylsilanetriol sodium salt, as well as the salts of other acid-based silane coupling agents such as 4-carboxybutyltriethoxysilane $(CH_3CH_2O)_3$ $Si(CH2)4$ $CO_2H$, 10-carboxydecyltriethoxysilane $(CH_3CH_2O)_3Si(CH_2)_{10}CO_2H$, etc. Similarly, a variety of diacid-based silane coupling agents are available, with the hydrolysis product of 3-(3-trimethysilylpropylthio) succinic anhydride, aqueous ammonia providing one acceptable formulation.

In addition to agents including a hydrophilic moiety, in various embodiments one or more agents including a hydrophobic moiety are also bound to the surface of the inorganic particle.

The surface modified inorganic particle material can be characterized, in some embodiments, by the amount of the surface area of the particles covered by the hydrophilic and hydrophobic agents. The following table shows typical molar amounts of silane compounds needed to obtain full surface area coverage (which shall be referred to herein as 100 percent surface coverage). Smaller particle sizes, such as at a diameter of 5 nm, can deviate somewhat in requiring slightly less silane than would be otherwise expected based on the diameter in order to achieve full (or 100 percent) surface area coverage. It will be appreciated that the use of additional amounts of silane compounds is contemplated (e.g., in addition to the amounts needed for 100 percent coverage or overcharging).

| Typical Particle Diameter (nm) | Typical Surface Area (m²/g) | Typical mmoles silane/gram Dry Silica |
|---|---|---|
| 12 | 227 | 1.033 |
| 20 | 135 | 0.62 |
| 50 | 55 | 0.248 |
| 85 | 35 | 0.146 |

In various embodiments, amounts used of the hydrophilic and hydrophobic silane compounds together is sufficient to cover at least about 5 percent, 10 percent, 15 percent, 20 percent, 25 percent, 30 percent, 35 percent, 40 percent, 45 percent, 50 percent, 55 percent, 60 percent, 65 percent, 70 percent, 75 percent, 80 percent, 85 percent, 90 percent, 95 percent, or 100 percent of the surface area of the particles.

In various embodiments, amounts used of the hydrophilic and hydrophobic silane compounds together is sufficient to cover 5-100 percent; in some embodiments 15-80 percent; in some embodiments 25-70 percent; in some embodiments 30-50 percent; in some embodiments 35-45 percent; in some embodiments about 40 percent of the surface area of the particles.

The hydrophilic agent can cover 5 to 99.9 percent of the surface of the inorganic particles; in some embodiments 5 to 60 percent of the surface of the inorganic particles; in some embodiments 5 to 50 percent of the surface of the inorganic particles; in some embodiments 10 to 40 percent; in some embodiments 10 to 30 percent; in some embodiments 15 to 25 percent; in some embodiments about 20 percent.

In various embodiments, a lesser amount of the hydrophobic agent on a molar basis is used in comparison with the hydrophilic agent. The hydrophobic agent can cover 0.1 percent to 10 percent of the surface area of each inorganic particle; in some embodiments 0.5 to 5 percent; in some embodiments about 1 percent.

The ratio of the hydrophilic agent coverage to the hydrophobic agent coverage can be from about 80:1 to about 2:1 (mole:mole); in some embodiments from about 40:1 to about 4:1; in some embodiments from about 30:1 to about 10:1; in some embodiments, from about 25:1 to about 15:1.

In some embodiments, particles of a single specific surface coverage amount and/or hydrophobic to hydrophilic modification ratio can be used. In other embodiments, particles of a first specific surface coverage amount and/or hydrophobic to hydrophilic modification ratio can be used in conjunction with particles of a second (or subsequent) specific surface coverage amount and/or hydrophobic to hydrophilic modification ratio.

The surface modification can be accomplished by any suitable means. In some embodiments, the hydrophilic and hydrophobic agents are added to the suspension and allowed time to adhere to the inorganic particle surfaces. The time can range from minutes to hours. In some cases, the hydrophilic and hydrophobic agents are added at the same time. In other cases, the hydrophilic and hydrophobic agents can be adhered to the inorganic particle surfaces in separate steps.

In the case of some silane coupling agents, suitable catalysis and elevated temperature may be required to complete the surface modification. In the case of ionic coupling agents, additional base may be added to neutralize the free acid or facilitate other reactions such as hydrolysis of anhydride functionality.

Aqueous coating compositions herein can also include a film-forming polymer composition. The film-forming polymer composition can assume a wide variety of forms and can include one or more polymers (including, but not limited to polymers, copolymers, and terpolymers) and water. In some embodiments, the film-forming polymer composition can be emulsion-based. The polymer composition can include polymer(s) that are acrylic polymers, acrylic copolymers, styrene-acrylic copolymers, or blends thereof. Acrylic polymers contain only one type of acrylate monomer, whereas the acrylic copolymers comprise two or more different types of acrylate monomers. Styrene-acrylic copolymers comprise at least one type of styrene monomer and one type of acrylate monomer. The acrylate monomers can include acrylic acid, butyl acrylate, ethyl acrylate, methyl acrylate, 2-ethyl hexyl acrylate, acrylonitrile, acrylamide, methacrylic acid, methyl methacrylate, ethyl methacrylate, butyl methacrylate, methacrylamide, and the like. Styrene monomers can include styrene, alpha-methyl styrene, and the like.

Commercially available acrylic copolymers suitable for surface coating compositions include, but are not limited to, methyl methacrylate/butyl acrylate/methacrylic acid (MMA/BA/MAA) copolymers, methyl methacrylate/butyl acrylate/acrylic acid (MMA/BA/AA) copolymers, and the like.

Suitable commercially available styrene-acrylic copolymers include, but are not limited to, styrene/methyl methacrylate/butyl acrylate/methacrylic acid (S/MMA/BA/MMA) copolymers, styrene/methyl methacrylate/butyl acrylate/acrylic acid (S/MMA/BA/AA) copolymers, and the like.

Commercially available acrylic polymers suitable for surface coating compositions include, for example, Morglo II Latex from Omnova Solutions, Inc., of Chester S.C. Other commercially available acrylic copolymers include: Rhoplex B-924, Roshield 3188, and Duraplus 3 from Dow Chemical of Midland, Mich., Megatran 220 and Megatran 240 from Interpolymer Corporation of Canton, Mass., MAC 34 and AC 2728 from Alberdingk Boley, Inc. of Greensboro, N.C.

Commercially available acrylic urethane hybrid copolymers include the Hybridur family of products such as Hybridur 870 and 878 from Air Products, Inc., APU 10140, APU 10600, and APU 10620 from Alberdingk Boley, Inc., and NeoPac R-9036 and E-129 from DSM NeoResins, Inc. of Wilmington, Mass.

Commercially available urethane polymers include the U series of solvent free polyurethane dispersions such as U 6150 and U 9380 from Alberdingk Boley, Inc., Bayhydrol UH 2558 and UH 2606 from Bayer Materials Science, NeoRez R-2180, NeoRez R-2005, NeoRez R-9029 and NeoRez R-2190 from DSM NeoResins, Inc., and the Sancure and Turboset polyurethane dispersions available from Lubrizol Corporation of Cleveland, Ohio.

In an embodiment, the film-forming polymer composition incorporates acrylic chemistry based components in combination with polyurethanes (poly(urethane-acrylate) hybrids). Polyurethanes and polyacrylates can be used together to achieve coatings that are both hard and tough. In another embodiment, the film-forming polymer matrix includes a hybrid copolymer consisting of urethane and acrylic polymer chains. In an embodiment, the acrylic urethane hybrid polymer can be added to commercially available acrylic-based surface coating compositions.

In various embodiments, epoxides can also be used as part of the polymer composition. In various embodiments, polyacrylate-epoxides can be used.

The polymer composition (as a component of the overall aqueous coating composition) can include at least about 10% by weight of the polymer; in some embodiments at least about 15% by weight of the polymer; in some embodiments at least about 20% by weight of the polymer; in some embodiments at least about 25% by weight of the polymer; in some embodiments at least about 30% by weight of the polymer; in some embodiments at least about 35% by weight of the polymer; in some embodiments at least about 40% by weight of the polymer; in some embodiments at least about 45% by weight of the polymer; in some embodiments at least about 50% by weight of the polymer; in some embodiments at least about 55% by weight of the polymer; in some embodiments at least about 60% by weight of the polymer.

The overall aqueous coating composition can contain between about 5 and 50 weight percent polymer solids in some embodiments and in other embodiments between about 10 and 35 weight percent polymer solids. The weight ratio of polymer composition solids to surface modified inorganic particle material solids can be in the range of 1:5-20:1; in some embodiments 0.7:1 to 8:1; and in some embodiments 0.7:1 to 4:1. In some embodiments, the amount of the surface modified inorganic particle material solids exceeds the weight ratio of 4:1 polymer composition solids to surface modified inorganic particle material solids. In some embodiments, the amount of the surface modified inorganic particle material solids exceeds the weight ratio of 2:1 polymer composition solids to surface modified inorganic particle material solids. In some embodiments, the amount of the surface modified inorganic particle material solids exceeds the weight ratio of 3:2 polymer composition solids to surface modified inorganic particle material solids. In some embodiments, the amount of the surface modified inorganic particle material solids exceeds the weight ratio of 4:3 polymer composition solids to surface modified inorganic particle material solids. In some embodiments, the amount of the surface modified inorganic particle material solids exceeds the weight ratio of 10:9 polymer composition solids to surface modified inorganic particle material solids. In some embodiments, the amount of the surface modified inorganic particle material solids exceeds the weight ratio of 1:1 polymer composition solids to surface modified inorganic particle material solids.

In some embodiments, the aqueous coating composition can include 3-50% by weight of an external cross-linking agent. External crosslinking agents are available commercially and include, but are not limited to, water dispersible isocyanates and carbodiimides. Typically, these agents are mixed into the aqueous coating prior to application. After mixing, the crosslinking agent is well dispersed in the aqueous formulation and can chemically react with one or more components in the formulation. Typically, the isocyanate reacts with one or more polymers in the composition after the coating has dried. Commercial examples of these isocyanates include Bayhydur 304 and 305 and are available from Bayer Material Science. Use of these isocyanates in a coating can improve a number of coating properties including mar resistance, detergent resistance, hot water resistance, and solvent resistance. Furthermore, these compounds can improve overall durability and/or wear resistance of a coating.

The surface coating compositions can also contain other components such as polyvalent metal compounds, alkali soluble resins, waxes, permanent and fugitive plasticizers, defoamers, wetting agents, and biocides. The polyvalent metal compound provides crosslinking of the polymers in the film and increases the detergent resistance of the coating. Plasticizers or coalescing agents can be added to lower the temperature of film formation. Alkali soluble resins improve the ability of the coating to be stripped from the substrate before reapplication of a fresh coating. Waxes improve the gloss of the coating and allow the coating to be buffed.

Biocides help minimize the formation of molds or mildew in the coating. Antifoamers and defoamers minimize the formation of bubbles in the coating.

Suitable polyvalent metals include beryllium, cadmium, copper, calcium, magnesium, zinc, zirconium, barium, strontium, aluminum, bismuth, antimony, lead, cobalt, iron, nickel, and the like. Although the polyvalent metal compound can be added to the coating composition in dry form such as powder, it can also be added as a solution. The polyvalent metal compound can be a metal complex, a metal salt of an organic acid, or a metal chelate. The ammonia and amine complexes of these metals are useful because of their high solubility. Amines capable of complexing many metals include, for example, monoethanol amine, diethylaminoethanol, and ethylenediamine. Polyvalent metal complexes and salts of organic acids can be soluble in an alkaline pH range. Anions of organic acids include acetate, formate, carbonate, glycolate, octanoate, benzoate, gluconate, oxalate, lactate, and the like. Polyvalent metal chelates where the ligand is a bidentate amino acid such as glycine or alanine can also be used.

Zinc and cadmium are exemplary polyvalent metal ions. Exemplary polyvalent metal compounds include zinc acetate, cadmium acetate, zinc glycinate, cadmium glycinate, zinc carbonate, cadmium carbonate, zinc benzoate, zinc salicylate, zinc glycolate, and cadmium glycolate. In some applications, a fugitive ligand such as ammonia can be used. A ligand is considered fugitive if at least a portion of the ligand tends to volatilize as the coating dries to form a film on the substrate.

The alkali-soluble resins can include copolymers of styrene or vinyl toluene with at least one α-β-monoethylenically unsaturated acid or anhydride such as styrene-maleic anhydride resins, rosin/maleic anhydride adducts which are condensed with polyols, and the like. The alkali-soluble resins can have a weight average molecular weight from about 500 to 10,000 and in some embodiments from about 1000 to 5000. The resins are often used as a conventional resin cut, which is an aqueous solution of the resin with an alkaline substance having a fugitive cation such as ammonium hydroxide. The alkali soluble resin can be included in amounts from 0 to about 20 weight percent and in some embodiments in amounts from 0 to about 15 weight percent based on the weight of the coating composition.

The waxes or mixtures of waxes that can be used include waxes of a vegetable, animal, synthetic, and/or mineral origin. Representative waxes include, for example, carnuba, candelilla, lanolin, stearin, beeswax, oxidized polyethylene wax, polyethylene emulsions, polypropylene, copolymers of ethylene and acrylic esters, hydrogenated coconut oil or soybean oil, and the mineral waxes such as paraffin or ceresin. The waxes can be included in amounts from 0 to about 15 weight percent and in some embodiments from about 2 to about 10 weight percent based on the weight of the coating composition.

In some embodiments, the aqueous coating composition can include from about 1 to about 10 weight percent plasticizer based on the weight of the coating composition. The plasticizer facilitates film formation at ambient temperatures when the coating is applied to a substrate. A fugitive or semi-fugitive plasticizer can be used instead of a permanent plasticizer for many applications. A fugitive or semi-fugitive plasticizer is a plasticizer that at least partially evaporates as the coating dries. Permanent plasticizers do not evaporate. Mixtures of fugitive and permanent plasticizers can be used. The particular plasticizer and the amount used are chosen in accordance with the demand for compatibility with the formulation, efficiency in lowering the film-forming temperature, and clarity of the coating.

Fugitive plasticizers or coalescents include, for example, the monobutyl, monoethyl, monomethyl or other monoalkyl ethers of diethylene glycol or diproplyleneglycol, isophorone, benzyl alcohol, butyl cellosolve, and 3-methoxybutanol-1. Permanent plasticizers include, for example, benzyl butyl phthalate, dibutyl phthalate, dimethyl phthalate, triphenyl phosphate, 2-ethyl hexyl benzylphthalate, fatty oil acid esters of caprolactam, acetyl tributyl citrate, toluene ethyl sulfonamide, tributoxyethyl phosphate, and tributyl phosphate.

The aqueous coating compositions herein can have a total solids content from about 5 to about 50 weight percent. In some embodiments, aqueous coating compositions herein can have a total solids content from about 10 to about 50 weight percent. The aqueous coating compositions herein can have a total solids content from about 5 to about 15 weight percent. In one embodiment, the total solids can range from about 10 to about 30 weight percent and in some embodiments from about 15 to about 25 weight percent based on the weight of the coating composition. In another embodiment, a concentrated coating composition is provided containing up to about 35 to about 50 weight percent solids based on the weight of the coating composition. Such concentrated compositions can be diluted prior to use by either mixing the concentrate with water or by applying the coating composition with a wet mop or applicator.

The pH of the coating composition can be in the range of about 6 to about 10.5 in some embodiments. In other embodiments, the pH is between about 7.5 and about 9.9. The pH can be adjusted using various bases or buffering agents. Suitable bases or buffering agents include, for example, borax, sodium hydroxide, alkali phosphates, alkali silicates, alkali carbonates, ammonia, and amines such as diethanolamine or triethanolamine.

Another aspect includes a method for applying the coating compositions described herein. The coating can be applied to a variety of substrates including floor, wall, furniture, window, counter top and bathroom surfaces. The substrates can be fibers, metal, plastic, wood, stone, brick, glass, cement, concrete, ceramic masonite, dry wall, plaster, plastic, and the like. Bathroom surfaces can be countertops, shower stalls, toilets, and urinals. In some embodiments, the substrate is a floor surface. The floor surface can be wood, composite vinyl tile, vinyl linoleum, asphalt, asbestos, concrete, ceramic, and the like.

In some embodiments, the coating composition can be applied through the application of a single coat. In other embodiments, the coating composition can be applied through the application of multiple coats. As an example, in some embodiments, the coating composition can be applied through the application of 1 to 10 coats onto a substrate. In some embodiments, the coating can be applied through the application of 2 to 8 coats onto a substrate. The thickness of the resulting coating can depending on various aspects including, but not limited to, the number of coats applied. In some embodiments, the coating thickness can be from about 1 micron to about 50 microns. In some embodiments, the coating thickness can be from about 5 microns to about 40 microns. In some embodiments, the coating thickness can be from about 2 microns to about 8 microns.

Densifying agents can provide various desirable properties to a substrate material including one or more of enhanced durability, reduced liquid permeability, enhanced stain resistance, etc. In some embodiments, compositions herein can be densifying compositions. In some embodiments herein, a method of densifying a substrate is included. The method can include applying an aqueous coating composition to a substrate surface, the aqueous coating composition comprising particles. The particles can include an inorganic core, a surface on the outside of the core, an agent comprising a hydrophobic moiety adhering to the surface, and an agent comprising a hydrophilic moiety adhering to the surface, and a film forming polymer composition comprising a polymer and water. The method can further include drying the aqueous coating composition.

Embodiments herein may be better understood with reference to the following examples. However, these examples are not intended as limiting the scope herein.

EXAMPLES

Materials
Substrates: solid black VCT available from Armstrong; Silica Particles: a 40% aqueous colloidal spherical silica dispersion (stabilized with ammonium ion, Mean Particle Diameter=20 nm), available as NALCO 2327 from NALCO Chemical Company; Scotch Guard Resilient Floor protector: available from 3M, St Paul, Minn.; 5300 blue cleaning pad, available from 3M, St Paul, Minn.; modifying agents: 3-(triethoxysilyl)propylsuccinic anhydride and isooctyltrimethoxysilane both available from Gelest; Conformable water-resistant vinyl form with adhesive back (⅜' thick): used as liquid sample holder when adhered to tile for water sensitivity test, available from McMASTER-CARR, Elmhurst, Ill.

Tile Coating Procedure
The following coating procedure (corresponding to ASTM D1436) was used for the example herein. A piece (2"×2") of gauze sponge was placed in the center of a new black VCT, which was previously stripped by 3M Speed Stripper. 3.8 mL of floor coating composition (at a coating amount of 2000 SF/Gallon) was also placed in the center of tile. The gauze sponge was used to spread the coating evenly over the entire panel. The panel was left to dry for 30 minutes. The coating procedure was repeated until the desired number of coats had been applied to each panel. After the panels had been finally coated, they were left to dry completely for 7 days before testing was done.

Test Methods
Co-Efficient of Friction (COF) Test
A James Machine was used to test the coefficient of friction. For the test (corresponding to ASTM D2047), the leather foot was removed from the control environment. It was conditioned with one smooth stroke of light pressure on 400 grit sandpaper. The test tile was put in the machine and set up the foot. The start was pressed to begin the measurement. When measurement was complete, the COF was recorded. Then, the tile was rotated by 90 degrees, the machine was reset and the COF was measured again. At the end of measuring, the temperature and humidity in the room was recorded and the foot was placed back in the control environment.

The static coefficient of friction was tested 4 times on each panel along 4 directions perpendicular to the four edges of the tile. The average of the four readings was reported as measured value.

Water Resistance Test:
A one-inch diameter hole was created by die cutting a piece of conformable vinyl foam that was then firmly adhered to the coated tile. Deionized (DI) water was placed in the hole, and allowed to dwell for 1 h and 24 hr, respectively. After the designated period of time, the DI water was removed and the resistance of coating was visually assessed with following reference scale: (5—No Damage, No Mark; 4—No Damage with Mark; 3—Slightly Damaged, Slightly Glossy; 2—Slightly Damaged, Not Glossy; 1—Seriously Damaged).

Example 1

Hydrophilic Surface Modified Silica Particles (20% Anhydride Silane Coverage) ("$SiO_2$-01")

1000 grams of 20 nm silica Nalco 2327 (41 wt %) was added to a glass jar equipped with a magnetic stir bar. While stirring at room temperature, 15 grams of 3-triethoxysilyl propyl succinic anhydride was slowly added to the Nalco 2327 containing glass jar through a dropper over a period of 10 minutes while stirring well. After the addition was complete, the mixer was stirred for another 30 minutes, and the jar was sealed and placed in a 90° C. oven for 20 hours (no stirring while in oven). Upon cooling to room temperature, modified 20 nm silica particles having 20% surface coverage (by calculation) and 41.5% solids were obtained.

Example 2

Hydrophilic/Hydrophobic Surface Modified Particles (20% Anhydride Silane/1% Iso-Octyl Silane Coverage) ("$SiO_2$-02")

An oil bath was turned on and set at 95° C. to allow the oil to heat while the reaction was being prepared. 150 g of above hydrophilically modified Nalco 2327 was measured and placed into a 3-neck round-bottom flask (Ace Glass, Vineland, N.J.). A glass stir rod with a Teflon paddle was attached to the center neck of the round-bottom flask. The flask was lowered into the oil bath, a condenser was attached, and then the contents were allowed to stir at a medium-high rate. 150.05 g of methoxypropanol (Alfa Aesar, Ward Hill, Mass.) was measured in a 250 mL glass beaker, and then 0.09 g of isooctyltrimethoxysilane (Gelest Inc., Morrisville, Pa.) was measured into the beaker with methoxypropanol. The solution was mixed thoroughly and then added to the 3-neck round-bottom flask. The reaction was allowed to stir for 16 hours set on a timer in a 95° C. oil bath. The resulting modified nanoparticle solution was allowed to cool and then filtered through a 1 micron Acrodisc 37 mm glass fiber filter (Pall Life Sciences, Ann Arbor, Mich.). The resulting solids of the modified nanoparticles solution was 21.05 wt. %.

Example 3

Hydrophilic/Hydrophobic Surface Modified Particles (20% Anhydride Silane/5% Iso-Octyl Silane Coverage) ("$SiO_2$-03")

Nanoparticles were prepared using the same procedures as described above for Example 2. However, for this example, the amount of isooctyltrimethoxysilane was multiplied by a factor of 5.

Example 4

Hydrophilic/Hydrophobic Surface Modified Particles (20% Anhydride Silane/0.5% Iso-Octyl Silane Coverage) ("$SiO_2$-04")

An oil bath was turned on and set at 95° C. to allow the oil to heat while the reaction was being prepared. 150 g of hydrophilically modified Nalco 2327 (Nalco Company, Naperville, Ill.) at 20% surface coverage and 41.5% solids was measured into a 3-neck round-bottom flask (Ace Glass, Vineland, N.J.). A glass stir rod with a Teflon paddle was attached to the center neck of the round-bottom flask. The flask was lowered into the oil bath, a condenser was attached, and then the contents were allowed to stir at a medium-high rate. 100.61 g of Methoxypropanol (Alfa Aesar, Ward Hill, Mass.) was measured in a 250 mL glass beaker, and then 0.05 g of isooctyltrimethoxysilane (Gelest Inc., Morrisville, Pa.) was measured into the beaker with methoxypropanol. The solution was mixed thoroughly and then added to the 3-neck round-bottom flask. The reaction was allowed to stir for 16 hours set on a timer in a 95° C. oil bath. The resulting modified nanoparticle solution was allowed to cool and then further processed to remove methoxypropanol via solvent exchanging as follows.

Hybrid surface modified particles, 249.17 g, were weighed into a 500 mL round bottom flask. An azeotrope of methoxypropanol:water, 122.55 g, was removed via a rotavap (Buchi Corporation, New Castle, Del.). De-ionized water, 127.55 g, was added to the flask containing the modified particles and then solvent was removed from the modified particle solution again. This was repeated until methoxypropanol was no longer apparent. The final solution was filtered through a 1 micron Acrodisc 37 mm glass fiber filter (Pall Life Sciences, Ann Arbor, Mich.) with a solids content of 43.29 wt. %.

Example 6

Friction and Water Resistance Assessment

Test compositions were prepared by mixing the calculated amount of silica particles (no particles, $SiO_2$-1, $SiO_2$-2, $SiO_2$-3, or $SiO_2$-4) to 100 g of Resilient Protector (commercially available from 3M) with different loading levels (25, 50, 75 or 90 wt. %—details listed in Table 1 below). The mixed liquids were well stirred using magnetic stir bars, and then were coated on newly stripped black VCTs according to the procedure described above. The samples were allowed to dry under ambient conditions for 7 days before testing. Friction testing and water resistance testing were then performed according to the procedures above. The results are shown below in Table 1.

TABLE 1

| Samples | | Particle Loading to Polymer Solids* | Measured COF | Water Resistance (1 Hour Test) | Water Resistance (24 Hour Test) |
| --- | --- | --- | --- | --- | --- |
| No Particles | | 0% | 0.58 +/− 0.02 | 5 | 4 |
| $SiO_2$-1 | Test 1 | 25% | 0.74 +/− 0.04 | 4 | 4 |
| | Test 2 | 50% | 0.77 +/− 0.02 | 2 | 2 |
| | Test 3 | 90% | 0.79 +/− 0.03 | 1 | 1 |
| $SiO_2$-2 | Test 1 | 25% | 0.68 +/− 0.01 | 5 | 5 |
| | Test 2 | 50% | 0.72 +/− 0.03 | 5 | 5 |
| | Test 3 | 75% | 0.74 +/− 0.02 | 4 | 4 |
| | Test 4 | 90% | 0.77 +/− 0.03 | 4 | 4 |
| $SiO_2$-3 | Test 1 | 25% | 0.72 +/− 0.03 | 5 | 5 |
| | Test 2 | 50% | 0.72 +/− 0.01 | 5 | 5 |
| | Test 3 | 90% | 0.73 +/− 0.02 | 5 | 5 |
| $SiO_2$-4 | Test 1 | 25% | 0.73 +/− 0.01 | 5 | 5 |
| | Test 2 | 50% | 0.71 +/− 0.02 | 5 | 5 |
| | Test 3 | 90% | 0.73 +/− 0.03 | 5 | 5 |

*Wherein 100% represents 1:1 wt./wt.

It can been seen from Table 1 that addition of surface modified particles significantly increased the coefficient of friction, which is a critical performance factor for floor coatings since higher COF is beneficial in reducing the likelihood of slip and fall accidents. However, it also can be seen that while gaining friction benefits with increasing the particle loading level, there were decreases in water resistance. Such decreases are not desirable since floor maintenance heavily involves water.

However, when particles were surface modified with an agent including a hydrophobic moiety (iso-octyl silane) together with an agent including a hydrophilic moiety (anhydride silane) and these particles were incorporated into the floor coating, the particles still exhibited excellent dispensability and stability in the aqueous coating, and, significantly, the dried coating demonstrated excellent water resistance while still maintaining a higher COF. Table 1 above lists the test results of the floor coatings containing these hybrid surface modified particles having 0.5%, 1% and 5% surface coverage of the agent having a hydrophobic moiety. The results showed these coatings all exhibited excellent water resistance while still have higher COF.

Visual comparison of $SiO_2$-1 with $SiO_2$-3 (both at 90% loading of particles) after water resistance testing showed dramatic improvement of the coating water resistance with addition of the agent having a hydrophobic moiety.

Example 7

Coating with Hydrophilic/Hydrophobic Surface Modified Particles Deposited on Natural Stone Substrate A test composition including surface modified particles was prepared by mixing acrylic polymer:urethane polymer: modified particles (in a solids ratio of 3:14:10) to form an 11% solids mixture. The test composition was coated onto a marble tile floor and also a cementitious terrazzo floor using a microfiber mop. Prior to coating, the surfaces were prepared as follows: 1. wet polish with TRIZACT® Diamond Disc HX Gold using a 175 rpm floor machine, 2. wet polish with TRIZACT® Diamond Disc HX Red using a 175 rpm floor machine, wet polish with TRIZACT® Diamond Disc HX Blue using a 175 rpm floor machine, and 4. dry burnish with SCOTCH-BRITE® Purple Diamond Floor Pad Plus using a 2000 rpm corded burnisher. Two coats were applied. Each coat was at a coating weight of approximately 3000 sq.ft./gal.

For comparison, two coats of commercially available SCOTCHGARD® Stone Floor Protector were coated onto a different section of the same marble tile floor and cementitious terrazzo floor.

After allowing the coating to dry, gloss and Distinctness of Image (DOI) measurements were taken for both of the coatings on the different surfaces. For gloss testing, ASTM D523 was followed. For Distinctness of Image (DOI) measurements, ASTM D5767 was followed. Measurements were taken in five different areas. The results below are the average values from the five different locations.

| | Gloss (60°) | DOI (60°) |
| --- | --- | --- |
| Composition with Modified Particles | 83.9 | 91.1 |
| SCOTCHGARD ® Stone Floor Protector | 67.5 | 84.8 |

This example shows that the test composition with modified particles gave a coating with much higher gloss and DOI than did the commercially available SCOTCHGARD™ Stone Floor Protector product on stone floors.

What is claimed is:

1. A particle comprising:
   an inorganic core;
   a surface on the outside of the core;
   a plurality of hydrophobic agents adhered to the surface of the particle, and comprising a hydrophobic moiety extending from the particle surface; and
   a plurality of hydrophilic agents adhered to the surface of the particle, and comprising a hydrophilic moiety extending from the particle surface;
   wherein the particle has a diameter of between about 5 nm and about 200 nm;
   wherein at least about 20% of the particle surface is covered by the agents comprising a hydrophilic moiety and the agents comprising a hydrophobic moiety;
   wherein the ratio of agents comprising a hydrophilic moiety to agents having a hydrophobic moiety is from about 80:1 to about 2:1 (mole:mole).

2. The particle of claim 1, wherein the hydrophilic moiety of the hydrophilic agent does not include polyethylene glycol.

3. An aqueous coating composition comprising:
   surface-modified particles, each particle comprising
      an inorganic core,
      a surface on the outside of the core,
      a hydrophobic agent adhered to the surface of the particle, and comprising a hydrophobic moiety extending from the particle surface, and
      a hydrophilic agent adhered to the surface of the particle, and comprising a hydrophilic moiety extending from the particle surface, and a film forming polymer composition comprising a polymer and water;
   wherein the surface-modified particles are mixed with the polymer composition.

4. The aqueous coating composition of claim 3, the agent comprising a hydrophobic moiety comprising a trialkoxy silane compound.

5. The aqueous coating composition of claim 3, the agent comprising a hydrophobic moiety comprising a compound of the formula $X^1-L^1-R^1$, wherein $X^1$ is an alkoxysilane or chlorosilane group, $L^1$ is a linking group, and $R^1$ is a hydrophobic moiety.

6. The aqueous coating composition of claim 3, the hydrophobic moiety comprising a chain length of $C_2$ to $C_{40}$.

7. The aqueous coating composition of claim 3, the agent comprising a hydrophilic moiety comprising a trialkoxy silane compound.

8. The aqueous coating composition of claim 3, the agent comprising a hydrophilic moiety comprising a compound of the formula $X^2-L^2-R^2$, wherein $X^2$ is an alkoxysilane or chlorosilane group, $L^2$ is a linking group, and $R^2$ is a hydrophilic moiety.

9. The aqueous coating composition of claim 3, the hydrophilic moiety selected from the group consisting of nonionic and ionic hydrophilic moieties.

10. The aqueous coating composition of claim 3, the particles having an average diameter of between about 5 nm and about 200 nm.

11. The aqueous coating composition of claim 3, the ratio of the agent comprising a hydrophilic moiety to the agent having a hydrophobic moiety comprising from about 80:1 to about 2:1 (mole:mole).

12. The aqueous coating composition of claim 3, wherein the polymer composition comprises the polymer dispersed within the water.

13. The aqueous coating composition of claim 3, wherein the polymer composition comprises at least about 10% by weight of the polymer.

14. The aqueous coating composition of claim 3, the polymer selected from the group consisting of polyurethane, polyacrylate, polyurethane-polyacrylate, epoxide, polyacrylate-epoxide and combinations thereof.

15. The aqueous coating composition of claim 3, further comprising a wetting agent.

16. The aqueous coating composition of claim 3, wherein the agent comprising a hydrophobic moiety is covalently bonded to the surface and the agent comprising a hydrophilic moiety is covalently bonded to the surface.

17. The aqueous coating composition of claim 3, exhibiting a coefficient of friction when dried on the surface of a substrate that is greater than about 0.6.

18. The aqueous coating composition of claim 3, exhibiting a water resistance when dried that is greater than an otherwise identical composition including only particles with an agent comprising a hydrophilic moiety adhering to the surface and lacking an agent comprising a hydrophobic moiety adhering to the surface.

19. The aqueous coating composition of claim 3, wherein the hydrophilic moiety of the hydrophilic agent does not include polyethylene glycol.

20. The aqueous coating composition of claim 3, wherein a dried coating formed from the aqueous coating composition exhibits water resistance sufficient for the coating to exhibit no damage after exposure to water for 24 hours.

21. A method of coating a substrate surface comprising:
   applying an aqueous coating composition to a substrate surface, the aqueous coating composition comprising surface-modified particles, each particle comprising
      an inorganic core,
      a surface on the outside of the core,
      a hydrophobic agent adhered to the surface of the particle, and comprising a hydrophobic moiety extending from the particle surface, and
      a hydrophilic agent adhered to the surface of the particle, and comprising a hydrophilic moiety extending from the particle surface, and
   a film forming polymer composition comprising a polymer and water;
   wherein the surface-modified particles are mixed with the polymer composition; and drying the aqueous coating composition.

22. The method of claim 21, the substrate surface comprising a material selected from the group consisting of cementitious materials and natural stone.

23. The method of claim 21, the resulting coating on the substrate surface comprising a gloss (60°-ASTM D523) of at least about 70.

24. The method of claim 21, the resulting coating on the substrate surface comprising a Distinctness of Image (60°-ASTM D5767) of at least about 86 about 2:1 (mole:mole).

25. The method of claim 21, wherein the hydrophilic moiety of the hydrophilic agent does not include polyethylene glycol.

26. The method of claim 21, wherein a dried coating formed from the aqueous coating composition exhibits water resistance sufficient for the coating to exhibit no damage after exposure to water for 24 hours.

* * * * *

UNITED STATES PATENT AND TRADEMARK OFFICE
CERTIFICATE OF CORRECTION

PATENT NO. : 10,465,079 B2
APPLICATION NO. : 15/113179
DATED : November 5, 2019
INVENTOR(S) : Feng Bai et al.

It is certified that error appears in the above-identified patent and that said Letters Patent is hereby corrected as shown below:

In the Claims

Column 16
Line 59 (Approx.), In Claim 24, delete "86 about 2:1 (mole:mole)." and insert -- 86. --, therefor.

Signed and Sealed this
Second Day of June, 2020

Andrei Iancu
*Director of the United States Patent and Trademark Office*